United States Patent [19]

Beblavi et al.

[11] 4,452,423
[45] Jun. 5, 1984

[54] MAGNETICALLY ACTUATED VALVE

[75] Inventors: James C. Beblavi, Littleton, Colo.; Laurence O. Williams, Orlando, Fla.

[73] Assignee: Martin Marietta Corporation, Bethesda, Md.

[21] Appl. No.: 404,808

[22] Filed: Aug. 3, 1982

[51] Int. Cl.³ .................. F16K 31/10; F16K 1/48; F16K 1/02
[52] U.S. Cl. ..................................... 251/65; 251/88; 251/133; 251/139
[58] Field of Search .............. 251/133, 65, 88, 327, 251/139; 137/219

[56] References Cited

U.S. PATENT DOCUMENTS

| | | | |
|---|---|---|---|
| 2,289,574 | 7/1942 | Carlson | 137/139 |
| 2,346,904 | 4/1944 | Carlson | 137/139 |
| 2,589,188 | 3/1952 | DeCraene et al. | 137/139 |
| 2,792,194 | 5/1957 | Huck | 251/65 |
| 3,134,404 | 5/1964 | Ziccardi | 137/625 |
| 3,282,554 | 11/1966 | Jones | 251/88 |
| 3,285,563 | 11/1966 | Clarkson | 251/88 X |
| 3,355,140 | 11/1967 | Andersen | 251/65 |
| 3,512,753 | 5/1970 | Weise | 251/88 X |
| 4,097,786 | 6/1978 | Lund | 251/133 X |
| 4,245,814 | 1/1981 | Shimizu | 251/65 |
| 4,284,262 | 8/1981 | Ruyak | 251/65 |

FOREIGN PATENT DOCUMENTS

| | | | |
|---|---|---|---|
| 1190759 | 4/1965 | Fed. Rep. of Germany | 251/133 |
| 2141519 | 2/1973 | Fed. Rep. of Germany | 251/133 |
| 1200372 | 6/1959 | France | . |
| 583755 | 10/1958 | Italy | . |

OTHER PUBLICATIONS

Warner/Beaver Ball Bearing Screw Catalog, dated 4/78, pp. 1–4.

Primary Examiner—Arnold Rosenthal
Attorney, Agent, or Firm—Patrick M. Hogan; Phillip L. DeArment; Gay Chin

[57] ABSTRACT

A magnetically actuated valve which includes a one-piece valve body, a linearly translatable poppet for selectively blocking an aperture in the valve body, a magnetically operable rotor, a magnetic collar or electromagnetic coil external to the valve body for inducing rotation of the rotor, and a screw and nut arrangement for converting rotational motion of the rotor into linear motion of the poppet.

12 Claims, 8 Drawing Figures ial leakage. Many, however, use
MAGNETICALLY ACTUATED VALVE

BACKGROUND OF THE INVENTION

1. Field of the Invention

This invention relates to valves and particularly to a new and improved valve which is magnetically actuated and which virtually eliminates fluid leakage to the outside of the fluid system.

2. Description of the Prior Art

Valves are used to control the flow of fluid through piping. A problem encountered with valves, however, is leakage of fluid through penetrations in the valve body, or outer shell of the valve, such as where the valve stem protrudes. Often, the valve body itself is fabricated of several sections which are bolted or threaded together, such valve body interfaces providing other potential leak paths for the fluid.

The wearing down of seals within a valve also contributes to leakage of fluid across the seal and to the outside of the fluid system. Dynamic seals, that is, seals which must block fluid flow while permitting relative motion between sealing members as the valve is opened or closed, tend to wear out faster than static seals, which block fluid flow only upon compression between sealing members. Thus, many typical currently used valves which employ multi-piece valve bodies having penetrations therethrough and dynamic seals therein are prone to fluid leakage, resulting in more frequent valve replacement and higher cost to the user.

Magnetically operated valves have been developed to help alleviate fluid leakage. Many, however, use multi-section valve bodies resulting in potential leak paths between sections. Such valves also often use conventional screw and nut arrangements to transform rotational motion of an actuating magnet into linear motion of a sealing member. Oversize and very expensive magnets may be required to rotate the screw in the nut, however, and the closing force available may be relatively small because of the high amount of sliding friction encountered between the male and female threads of the screw and nut.

In view of the above-mentioned problems, it is therefore an object of the present invention to provide a valve with virtually no external leakage by eliminating all penetrations through the valve body.

Another object of the present invention is to increase the useful service life of a valve by employing only static seals therein and by utilizing a simple valve drive mechanism.

Yet another object of the present invention is to provide a magnetically actuated valve employing a low friction screw and nut arrangement thereby allowing smaller, less expensive magnets to be used for actuation or, alternatively, obtaining a comparatively greater actuation force from standard magnetic materials.

SUMMARY OF THE INVENTION

The present invention, in accordance with one embodiment thereof, comprises a magnetically actuated valve which includes a one-piece valve body having two passages in fluid communication through an aperture, a linearly translatable sealing member for selectively blocking the aperture, a magnetically operable rotor, means external to the valve body for inducing rotation of the rotor, and means for converting rotational motion of the rotor into linear motion of the sealing member.

In a particular embodiment of the invention, the means for converting rotational motion into linear motion comprises a screw and nut arrangement while the means for inducing rotation of the rotor comprises either a magnetic collar or an electromagnetic coil. The sealing member is preferably connected with the screw in a manner whereby the sealing member translates linearly with the screw yet the screw can also rotate relative to the sealing member.

BRIEF DESCRIPTION OF THE DRAWING

This invention will be better understood from the following description taken in conjunction with the accompanying drawing, wherein.

DESCRIPTION OF THE PREFERRED EMBODIMENT

Figure 1:
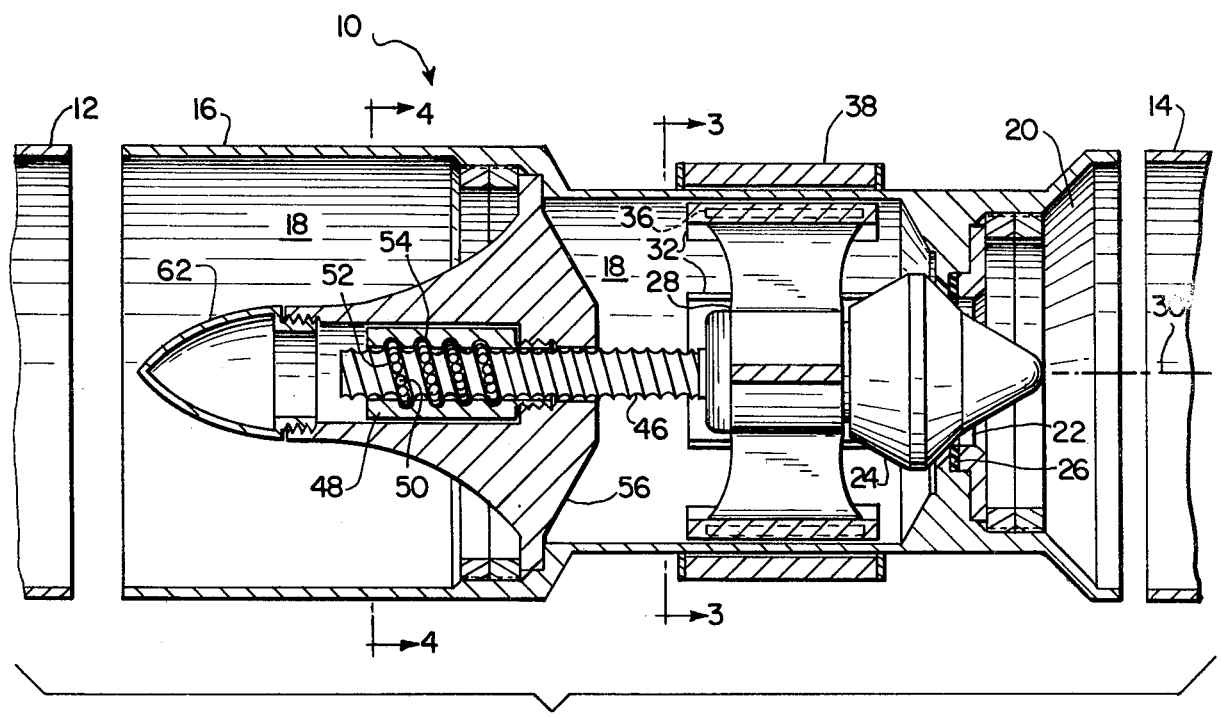
FIG. 1 is a cross-sectional view of the magnetically actuated valve of the present invention.

Turning now to a consideration of the drawing, and in particular to FIG. 1, there is shown a view of the magnetically actuated valve 10 of the present invention. The purpose of the valve 10 is to control the flow of fluid through the piping 12 and 14 to which the valve 10 is connected.

The valve 10 comprises a one-piece valve body 16 which includes first and second passages 18 and 20 in fluid communication through an aperture 22. By "one-piece" is meant either that the valve body has been fabricated as one piece or that it comprises sections that have been welded together so as to have effectively become one piece. The one-piece valve body 16 does not include any penetrations through its walls, such as valve stems or bolts, and therefore eliminates any leakage of fluid through its walls. The valve body 16 preferably has a generally cylindrical shape. In addition, the valve body 16 can be fabricated from any suitable material which is non-magnetic for reasons to be explained hereinafter. The valve 10 is connected to the piping 12 and 14 in any appropriate manner, such as, for example, by threading, welding, brazing or bolted flanges. When it is desired to make the connection between the valve 10 and the piping virtually leak proof, however, it is preferable that they be welded together.

Within the first passage 18 of the valve body 16 is a linearly translatable sealing member, such as the poppet 24, which is sized and shaped for, when in the closed position shown in FIG. 1, blocking the flow of fluid through the aperture 22. To resume the flow of fluid, the poppet 24 is translated to an open position away from the aperture 22, the amount of fluid flow being controllable by selectively varying the distance between the poppet and the aperture. Preferably, the aperture 22 includes a seal 26 against which the poppet 24 abuts in the closed position to reduce or eliminate leakage of fluid acros the aperture.

The valve 10 includes a unique arrangement of elements for effecting linear translation of the sealing member, or poppet 24, between open and closed positions. The arrangement includes a magnetically operable rotor, means external to the valve body 16 for inducing rotation of the rotor and means for converting rotational motion of the rotor into linear motion of the sealing member.

Figure 2:
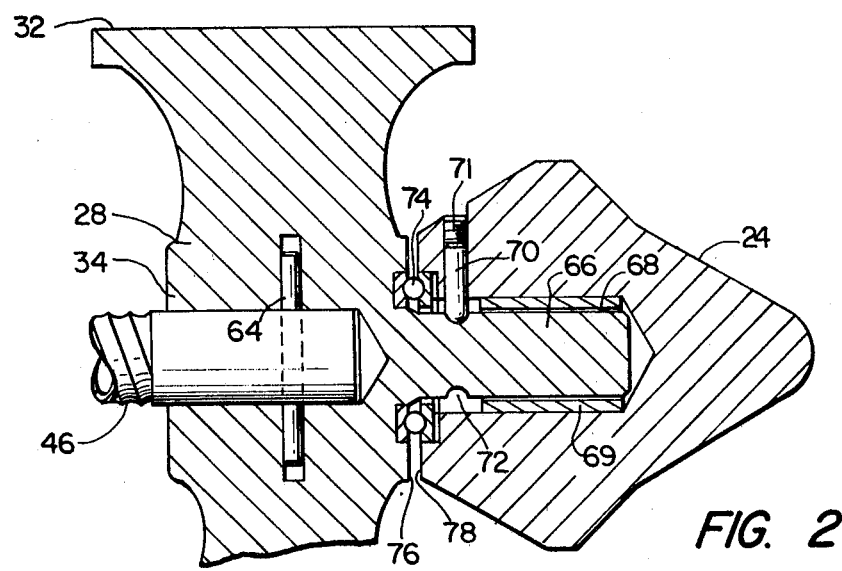
FIG. 2 is an enlarged view of the rotor and poppet of the valve.
Figure 3:
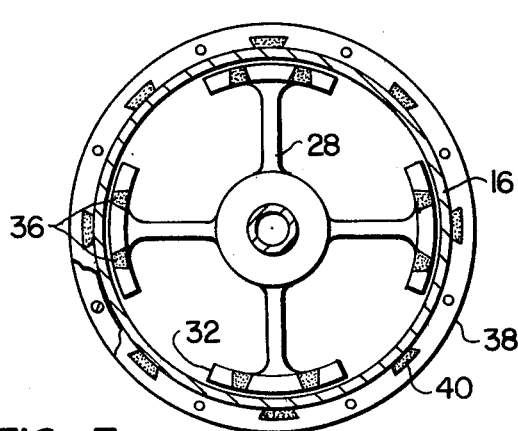
FIG. 3 is a view of the rotor and magnetic collar taken along lines 3—3 of FIG. 1.

As can be seen in FIG. 1, a rotor 28 is disposed within the first passage 18 of the valve body 16 for rotation in a plane substantially normal to the axis of translation, depicted by the dashed line 30, of the sealing member, or poppet 24. Referring to FIG. 2, the rotor 28 can be seen to have a radially outer section 32 and a hub section 34. The rotor 28 can be fabricated as a one-piece unit, such as by casting, or its radially outer and hub sections can be connected in an appropriate manner, such as by bolting or welding. As can be seen in FIG. 3, the radially outer section 32 of the rotor 28 includes a plurality of permanent magnets 36 mounted thereon, such as by being inserted into dovetail slots in the rotor, thus making the rotor magnetically operable. If the magnets are to be exposed to a corrosive fluid flowing through the valve 10, they can be encapsulated by a thin layer of chemically inert plastic, ceramic or non-magnetic metal prior to being inserted into the dovetail slots. The magnets used can be selected from the total class of permanent magnet materials available, such as rare earth alloys, alnico, ferrite ceramic or any other type. Such a selection allows great flexibility in designing valves for optimum cost, closing and opening force, corrosion resistance, temperature requirements and other important factors.

FIG. 3 shows an example of means external to the valve body 16 for inducing rotation of the rotor 28, in this case a rotatable magnetic collar 38. The magnetic collar 38 is disposed slidingly adjacent the outer surface of the valve body 16 and includes a plurality of permanent magnets 40 attached thereto, such as by being inserted into dovetail slots. The permanent magnets 36 and 40 are oriented by polarity on the rotor 28 and magnetic collar 38, respectively, such that when the magnetic collar 38 is rotated, the rotor 28 will likewise rotate within the valve body 16. As was indicated earlier, the valve body 16 is fabricated of a non-magnetic material so as to avoid interference between the magnetic collar 38 and the rotor 28. In order to prevent unauthorized actuation of the valve, the magnetic collar 38 can be configured such that it is removable from the valve body, such as by assembling it from two semicircular pieces. This also allows the magnetic collar to be used on more than one valve, thus providing a cost savings.

Figure 6:
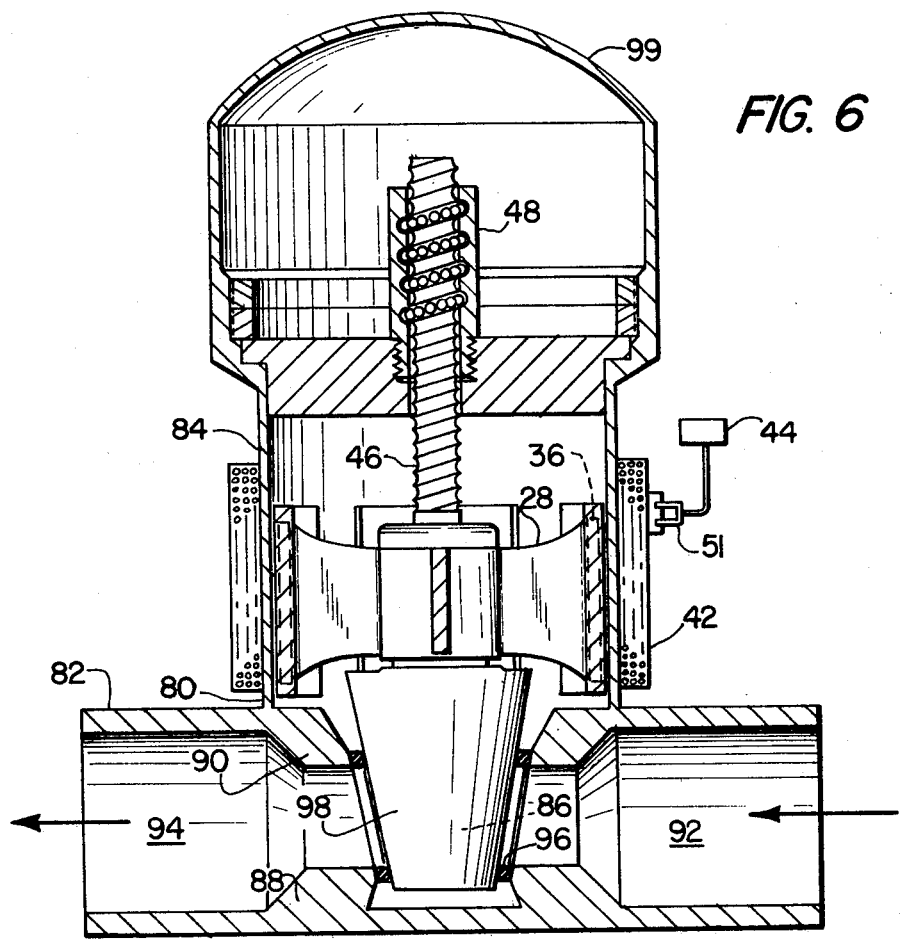
FIG. 6 is a cross-sectional view of another embodiment of the valve of the present invention.

Briefly turning to FIG. 6 which shows an alternate valve embodiment, there can be seen another example of means external to the valve body for inducing rotation of the rotor 28. Here, the means comprises a properly configured electromagnetic coil arrangement 42 which includes necessary pole pieces and which surrounds the outer surface of the valve body. When electricity from a power source 44 is applied to the coil 42 in a properly controlled manner, an electromagnetic field is created which causes the rotor 28 to rotate until electrical power is removed from the coil 42. In order to prevent unauthorized actuation of the valve for security reasons or to permit one power source 44 and control cord to power several valves, the electromagnetic coil arrangement 42 can be configured such that the coil can be selectively isolated from the power source 44, such as by employing a removable connector 51.

Figure 6A:
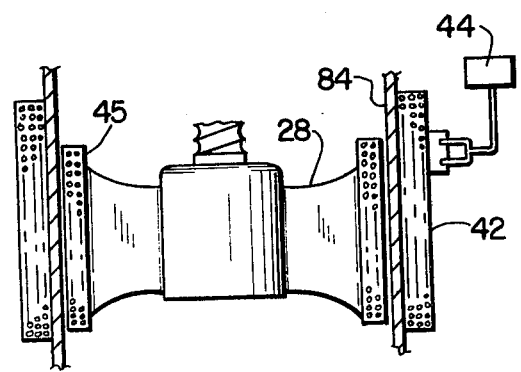
FIG. 6A is a view of an alternate configuration of the rotor section of the valve.

FIG. 6A, which is a cross sectional view of a portion of the rotor section of a valve, shows another alternative arrangement of means for inducing rotation of the rotor 28. The means external to the valve body comprises a properly configured electromagnetic coil arrangement 42 similar to that of FIG. 6. However, rather than permanent magnets, the radially outer section of the rotor 28 includes attached thereto a second properly configured electromagnetic coil arrangement 45 including necessary pole pieces. Electrical power is applied in a controlled manner to the external electromagnetic coil such that the resultant magnetic field created by the external coil will induce currents and fields within the second electromagnetic coil thereby inducing rotation of the rotor.

Returning to FIG. 1, the means for converting rotational motion of the rotor 28 into linear motion of the sealing member, or poppet 24, preferably comprises a screw and nut arrangement disposed within the first passage 18 of the valve body 16. In such an arrangement, relative rotation between the screw and nut effects linear motion of the screw and of the poppet 24, the screw being connected with the poppet. In FIG. 1, the rotor 28 is rigidly attached to a screw 46 while a nut 48 is fixedly attached within the valve body 16. Thus, the nut 48 is held in a fixed position while the screw 46 is rotated through the nut 48 by the rotor 28, causing the screw 46, as well as the rotor 28, to also translate linearly along the axis 30, generally parallel to the direction of flow of fluid through the valve body 16. If desired, the arrangement could be configured alternatively (not shown) whereby the nut is rotated by the rotor 28 while the screw is permitted only to translate linearly.

Numerous types of screws and nuts can be successfully employed in the valve 10. The mechanical efficiency of the rotor 28 which rotates the screw 46 can be increased, however, by reducing the friction loss between the screw and the nut. The ballbearing screw shown in FIG. 1 reduces friction losses by replacing the sliding friction between male and female threads in a conventional screw with rolling contact of bearing balls between the screw 46 and the nut 48. To accommodate the bearing balls 50, the screw 46 and the nut 48 each includes a ball race 52 and 54, respectively, which match each other in size and in which the bearing balls 50 are disposed. The pitch of the ball races 52 and 54 is preselected based upon factors such as the mechanical advantage required to overcome fluid pressure in the valve and the desired linear distance of screw travel for each rotation of the rotor 28. In such a reduced friction screw and nut arrangement, smaller, less expensive magnets are capable of rotating the rotor 28, thus making the valve less costly. Alternatively, if larger standard magnets are employed, comparatively greater actuation forces are available with the ball bearing screw arrangement than would be with a conventional screw with male and female threads. Of course, other types of screw and nut arrangements can also be employed such as, for example, conventionally threaded screws and high helix screws.

Figure 4:
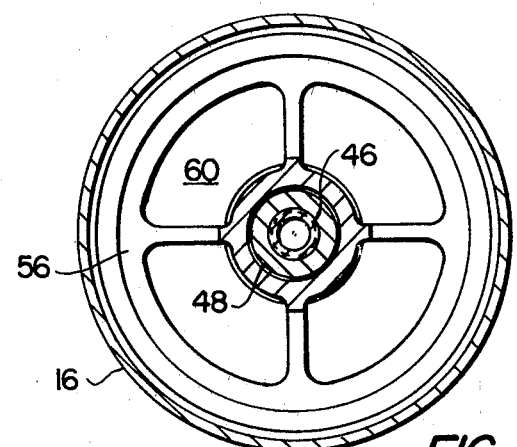
FIG. 4 is a view of the holding ring and nut of the valve taken along lines 4—4 of FIG. 1.

FIGS. 1 and 4 show a suitable manner of fixedly attaching the nut 48 within the valve body 16 by threading the nut into a holding ring 56. The holding ring 56 is fixedly attached at its radially outer portion to a stepped portion of the interior of the valve body 16 in any appropriate manner, such as by welding, bolting or threaded lock rings as shown, or the holding ring can be fabricated integral with the valve body 16. The holding ring 56 includes a plurality of openings 60 sized large enough to permit fluid to pass through them. In the configuration shown in FIG. 1, the rotor 28, the poppet 24 and the screw 46 are cantilevered from the holding ring 56. The cantilevered arrangement together with the stepped, interior diameter of the valve body 16, which decreases in diametric dimension from the outer ends of the first and second passages 18 and 20 toward the aperture 22, permits the poppet 24, rotor 28, screw 46, nut 48 and holding ring 56 to be preassembled and then easily inserted into the valve 10 as a unit.

Figure 1A:
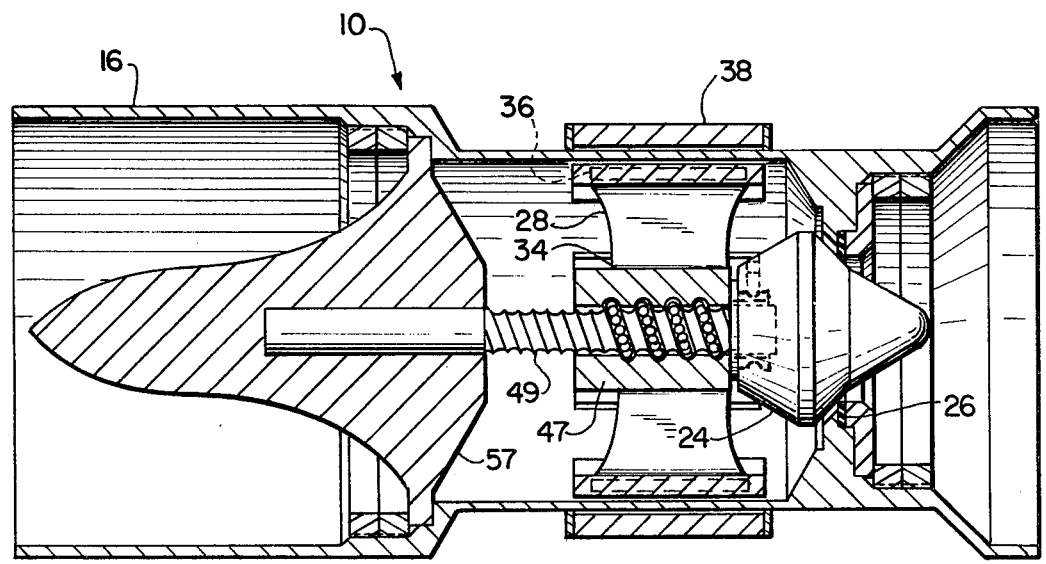
FIG. 1A is a view of an alternate embodiment of the valve wherein the screw is held fixed while the nut is rotated by the rotor.

Turning to FIG. 1A, there is shown an alternate embodiment of the valve 10 identical to that of FIG. 1 except that the nut, rather than the screw, is rotated by the rotor. The nut 47 is fixedly attached to the hub section 34 of the rotor 28. The screw 49 is fixedly attached within the valve body 16, such as to a holding ring 57, and extends through the nut 47. As the nut 47 is rotated by the rotor 28, the nut, rotor and poppet 24, which is connected with the hub section 34 of the rotor, translate linearly toward or away from the seal 26, thereby closing or opening the valve 10. The poppet 24 includes a recess therein to provide clearance for the screw as the poppet moves between the open and closed positions. It is to be understood that the features of the invention which are described with reference to the embodiment of FIG. 1 are also applicable, with only minor, if any, modifications, to the embodiment of FIG. 1A.

The valve 10 can be oriented such that fluid flows through it in either direction. However, when the nut 48 is at the upstream end of the valve and the poppet 24 is at the downstream end, as in FIG. 1, the valve 10 includes means, such as the bullet nose 62, disposed near the upstream end of the nut for streamlining the flow of fluid through the valve 10.

Referring to FIG. 1, the sealing member, or poppet 24, is preferably connected with the screw 46 in a manner whereby the poppet translates linearly with the screw along the axis 30 yet the screw can also rotate about the axis 30 relative to the poppet. The capability of relative rotation between the screw 46 and the poppet 24 allows the poppet to stop rotating when it translates into abutment with the seal 26. This capability promotes long seal life by eliminating relative rotational movement and the associated frictional scrubbing action between the poppet 24 and the seal 26. The seal 26 provides greater long-term sealing ability than would a seal in which there is relative rotational motion between sealing members. Additionally, the valve 10 can be successfully operated employing only static seals. This feature, together with the simplicity of the valve drive mechanism, increases the useful service life and reliability of the valve.

FIG. 2 shows one example of a connection permitting relative rotation between the poppet 24 and the screw 46. The hub section 34 of the rotor 28 is rigidedly attached to the screw 46 near an end of the screw, such as with a pin 64 extending through aligned openings in the rotor and screw. A protruding portion 66 of the hub section 34 extends into an opening 68 in the poppet 24 and a bushing 69 disposed between the protruding portion 66 and the poppet 24 provides support for the poppet. The poppet 24 includes at least one and preferably a plurality of equally spaced thrust pins 70 which extend therefrom into a recess 72 around the circumference of the protruding portion 66. A bearing 74 is also included between the poppet 24 and the hub section 34. Preferably, the bearing 74 is a ball thrust bearing disposed between adjacent, generally radially extending walls 76 and 78 defined by a portion of the hub section 34 and an end of the poppet 24, respectively. The thrust pins 70, which have curved inner ends to match the concave shape of the recess 72, and the bearing 74 permit the poppet 24 to rotate relative to the hub section 34 and screw 46, while the extension of the thrust pins 70 into the recess 72 allows the poppet to translate linearly with the rotor 28 and screw 46. The thrust pins 70 are held in place in any appropriate manner, such as with set screws 71.

Figure 5:
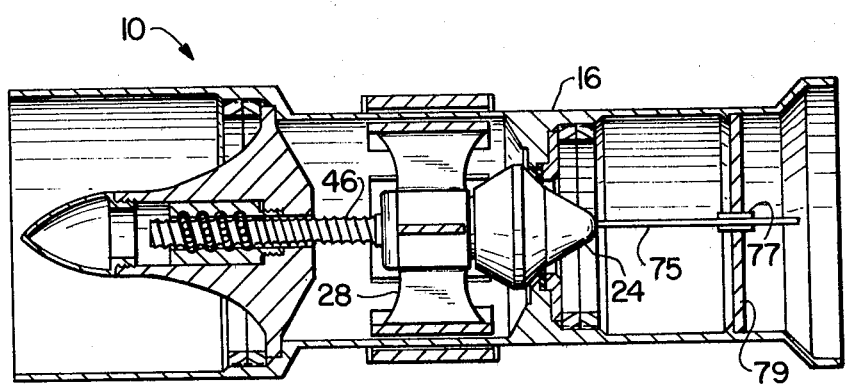
FIG. 5 is a cross-sectional view of a modified configuration of the valve.

Turning to FIG. 5, there is shown a modified configuration of the valve 10 which is identical to that shown in FIG. 1 except that a shaft 75 extends from the poppet 24 through a bushing 77 mounted near the center of a second holding ring 79 which is fixedly attached within the valve body 16. The shaft 75 is long enough that it remains in contact with the bushing 77 even when the poppet 24 is in a fully opened position. This arrangement provides additional support and alignment for the screw 46, the rotor 28 and the poppet 24 and might be employed when the poppet 24 is large or when precision alignment is required.

Turning now to FIG. 6, there is shown another embodiment of the magnetically actuated valve. This embodiment is substantially similar and operates in the same manner as that shown in FIG. 1, the same numerals identifying identical elements, except that the valve body 80 is generally T-shaped including a base portion 82 through which fluid flows and a stem portion 84 which contains the screw 46, the nut 48 and the rotor 28. The base and stem portions 82 and 84 can be integral or can be welded together. An aperture 86 is defined by the flanges 88 and 90 within the base portion 82 between the first and second passages 92 and 94, and includes a seal 96 mounted on the flanges. In the stem portion, the screw 46 extends generally normal to the direction of flow of fluid, indicated by the arrows, through the base portion 82. The sealing member, or poppet 98, is shaped such that, when it is in the closed position shown in FIG. 6, it abuts the seal 96 and blocks the flow of fluid through the aperture 86. The poppet 98 could, for example, have a truncated cone shape. The valve body 80 includes an end cap 99, preferably dome shaped for providing improved structural resistance to pressure, which is attached to the end of the stem portion 84 after the internal components have been inserted therein. The end cap 99 is preferably welded to the stem portion 84 to provide a fluid-tight, one-piece valve body.

It is to be understood that this invention is not limited to the particular embodiments disclosed and it is intended to cover all modifications coming within the true spirit and scope of this invention as claimed.

What is claimed is:

1. A magnetically actuated valve comprising:
   (a) a one-piece, generally cylindrically-shaped valve body defining therein an aperture and first and second passages in fluid communication through said aperture, said valve body having a stepped interior diameter, decreasing in diametric dimension from outer ends of said first and said second passages toward said aperture;

(b) a sealing member linearly translatable within said first passage for selectively blocking flow through said aperture;

(c) a magnetically operable rotor disposed within said first passage;

(d) means external to said valve body for inducing rotation of said rotor;

(e) a screw and nut arrangement disposed within said first passage for converting rotational motion of said rotor into linear motion of said sealing member; and (f) a holding ring, the radially outer portion thereof being attached within said first passage to a stepped portion of said interior of said valve body, and wherein said holding ring, said sealing member, said rotor, and said screw and nut arrangement are configured for being insertable from an outer end of said first passage into said valve body and said sealing member, said rotor, and said screw and nut arrangement are supported by said holding ring.

2. The valve of claim 1 wherein said nut is fixedly attached within said valve body and said screw is rotated through said nut by said rotor and wherein said sealing member is connected with said screw in a manner whereby said sealing member translates linearly with said screw yet said screw can also rotate relative to said sealing member.

3. The valve of claim 2 wherein said rotor includes a hub section rigidly attached to said screw and wherein a portion of said hub section extends into an opening in said sealing member, said sealing member including at least one thrust pin extending therefrom into a recess around the circumference of said portion of said hub section and a bearing between said sealing member and said hub section thereby enabling said sealing member to translate with said screw yet also enabling said screw to rotate relative to said sealing member.

4. The valve of claim 3 wherein a portion of said hub section of said rotor and an end of said sealing member are shaped for defining adjacent, generally radially extending walls and wherein said bearing comprises a ball thrust bearing disposed between said walls.

5. The valve of claim 1 wherein said screw is fixedly attached within said valve body and said nut is rotated about said screw by said rotor and wherein said sealing member is connected with said nut in a manner whereby said sealing member translates linearly with said nut yet said nut can also rotate relative to said sealing member.

6. The valve of claim 2 or 5 wherein said screw extends generally parallel to the direction of flow of fluid through said valve body, wherein said aperture is defined by a generally annular valve seat including at least one seal disposed within said valve body and wherein said sealing member comprises a poppet sized and shaped for, when in a closed position, abutting said seal thereby blocking flow through said aperture.

7. The valve of claim 6 wherein said rotor includes a plurality of permanent magnets mounted thereon and wherein said means external to said valve body for inducing rotation of said rotor comprises a rotatable magnetic collar having a plurality of permanent magnets attached thereto.

8. The valve of claim 6 wherein said rotor includes a plurality of permanent magnets mounted thereon and wherein said means external to said valve body for inducing rotation of said rotor comprises an electromagnetic coil arrangement.

9. The valve of claim 6 wherein said rotor includes an electromagnetic coil arrangement attached near the radially outer section thereof and wherein said means external to said valve body for inducing rotation of said rotor comprises another electromagnetic coil arrangement.

10. The valve of claim 2 or 5 wherein said nut includes a ball race on the inner surface thereof, said screw includes a ball race on the outer surface thereof matching said ball race of said nut, and further comprising a plurality of bearing balls disposed in said ball races for providing rolling contact between said nut and said screw.

11. The valve of claim 6 wherein at lest said screw, said rotor and said poppet are cantilevered from said holding ring.

12. A magnetically actuated valve comprising:

(a) a one-piece, generally cylindrically-shaped valve body defining therein an aperture and first and second passages in fluid communication through said aperture, said valve body having a stepped interior diameter, decreasing in diametric dimension from outer ends of said first and said second passages toward said aperture, said aperture being further defined by a generally annular valve seal including at least one seal, (b) a poppet linearly translatable within said first passage, said poppet being sized and shaped for, when in a closed position, abutting said seal thereby blocking flow through said aperture;

(c) a magnetically operable rotor disposed within said first passage;

(d) means external to said valve body for inducing rotation of said rotor;

(e) a screw and nut arrangement disposed within said first passage for converting rotational motion of said rotor into linear motion of said poppet, said nut being fixedly attached within said first passage and said screw extending generally parallel to the direction of flow of fluid through said valve body, said screw being rotated through said nut by said rotor and said poppet being connected with said screw in a manner whereby said poppet translates linearly with said screw yet said screw can also rotate relative to said poppet; and (f) a first holding ring, the radially outer portion thereof being attached within said first passage to a stepped portion of said interior of said valve body, a second holding ring attached within said second passage, a bushing mounted near the center of said second holding ring, and a shaft extending from said poppet through said bushing, said first and said second holding rings providing support and alignment for said screw and nut arrangement, said rotor and said poppet, and wherein said first holding ring, said sealing member, said rotor and said screw and nut arrangement are configured for being insertable from an outer end of said first passage into said valve body.

* * * * *